United States Patent [19]

Gupta et al.

[11] 4,074,357

[45] Feb. 14, 1978

[54] ANALOG CONTROL AND DIGITAL SYSTEM WITH INTEGRATED INTERFACE FOR ELECTRIC POWER AND OTHER PLANTS

[75] Inventors: Rash B. Gupta, West Deer Township, Pittsburgh County; David L. Armstrong, Pittsburgh, both of Pa.

[73] Assignee: Westinghouse Electric Corporation, Pittsburgh, Pa.

[21] Appl. No.: 705,631

[22] Filed: July 15, 1976

[51] Int. Cl.[2] .......... F02C 9/02

[52] U.S. Cl. .......... 364/494; 364/601; 364/103

[58] Field of Search .......... 235/151.21, 151, 151.1; 444/1; 290/40 R, 40 A-40 C, 52, 2; 60/39.18 B, 698, 719; 307/64, 67; 340/172.5

[56] References Cited

U.S. PATENT DOCUMENTS

| | | | |
|---|---|---|---|
| 3,097,486 | 7/1963 | Roe | 60/39.18 |
| 3,675,426 | 7/1972 | Vidal et al. | 60/39.18 B |
| 3,703,807 | 11/1972 | Rice | 60/39.18 B |
| 3,757,517 | 9/1973 | Rigollot | 60/39.18 B X |
| 3,762,162 | 10/1973 | Miura et al. | 60/39.18 B X |
| 3,849,662 | 11/1974 | Blaskowski et al. | 290/2 |
| 3,943,372 | 3/1976 | Smith et al. | 290/40 R |
| 3,979,904 | 9/1976 | Hobbs | 290/40 R X |

*Primary Examiner*—Edward J. Wise
*Attorney, Agent, or Firm*—E. F. Possessky

[57] ABSTRACT

An analog control system and a digital system are provided with an integrated interface for the input/output signals used in monitoring and controlling an electric power plant. Plant analog and digital inputs are processed through circuitry which provides input signals compatible for use in both the analog and the digital systems. Analog and digital outputs are similarly processed through circuitry which provides compatible signals. Output signals are directly applied from the analog control to the digital system or vice versa without need for buffering.

7 Claims, 21 Drawing Figures

PROCESS STATUS INPUTS —·—·—

PROCESS CONTROL OUTPUTS - - - - - -

ANALOG CONTROL AND DIGITAL SYSTEM WITH INTEGRATED INTERFACE FOR ELECTRIC POWER AND OTHER PLANTS

BACKGROUND OF THE INVENTION

The present invention relates to control systems for industrial processes and more particularly to hybrid digital/analog control systems for electric power plants.

In the operation of industrial processes and particularly electric power plants, the monitoring and control system commonly includes both an analog control system and a digital computer monitoring and/or control system. Many plant analog signals and many plant contact closure inputs are used by both systems, and many output signals from each system are used by the other system or commonly used to operate a controlled device or a monitoring device. Therefore, an interface between the analog and digital system is needed.

Traditionally, the analog control systems and the digital computer systems for a given installation are designed and manufactured by independent vendors and are interfaced for the first time at the installation site through costly signal conditioning hardware in addition to requiring duplicate process analog inputs and contact inputs for each of the systems. This means an overall complex system at higher initial equipment and installation and maintenance costs to the ultimate user.

In the power plant business, consultants and final users have traditionally considered the analog controls and the digital computer separately with stand alone specifications for each of the systems. Interface problems have resulted in startup delays and non-utilization of the full capability of the individual systems.

The purchase of separate transducers for each system has caused prices to be much higher than is necessary, due to the cost of the sensors themselves, installation costs, cabling costs, cabinet termination areas being duplicated and maintenance of the duplicated sensors.

In the prior United States patent art, Vercelotti U.S. Pat. No. 3,440,613 in FIG. 2 and Harple U.S. Pat. No. 3,351,911 show interface circuitry per se; Craft U.S. Pat. No. 3,818,447 discloses level conversion, and patents such as Stafford U.S. Pat. No. 3,828,325 disclose digital interfaces. None of the known prior art is directed to improvements in the described state of the digital/analog interface art pertaining to the total system level. However, improvements are needed in the structure of such interfaces for manufacturing economy and user convenience purposes. No representation is made that the prior art cited herein is the best prior art nor that other interpretations cannot be placed on it.

SUMMARY OF THE INVENTION

An integrated digital/analog control system for an electric power or other industrial plant comprises an analog control system and a digital computer monitoring and/or control system, with a plurality of plant transducers and transmitters generating respective analog signals. Respective circuit means are provided for powering each of the analog transmitters and for generating buffered analog signals corresponding to the transmitted analog signals and being compatible with both the analog and the digital systems. An analog input information panel provides for terminating the buffered analog signals, and means are provided for coupling each of the buffered analog input signals from the analog input information panel to one or both of the analog and digital systems. A plurality of plant contacts generate respective digital signals, and respective circuit means are provided for conditioning each of the digital signals to a logic level compatible to the analog and digital systems. A digital input information panel is provided for terminating the conditioned contact input signals, and means are provided for coupling each of the conditioned contact input signals from the digital input information panel to one or both of the analog and digital systems. Preferably, means are provided for coupling preselected digital and analog output signals from said digital system to said analog system without buffering and conditioning, and means are provided for coupling preselected digital and analog output signals between said analog system and said digital system without buffering and conditioning.

DESCRIPTION OF THE PREFERRED EMBODIMENT

Figure 1:
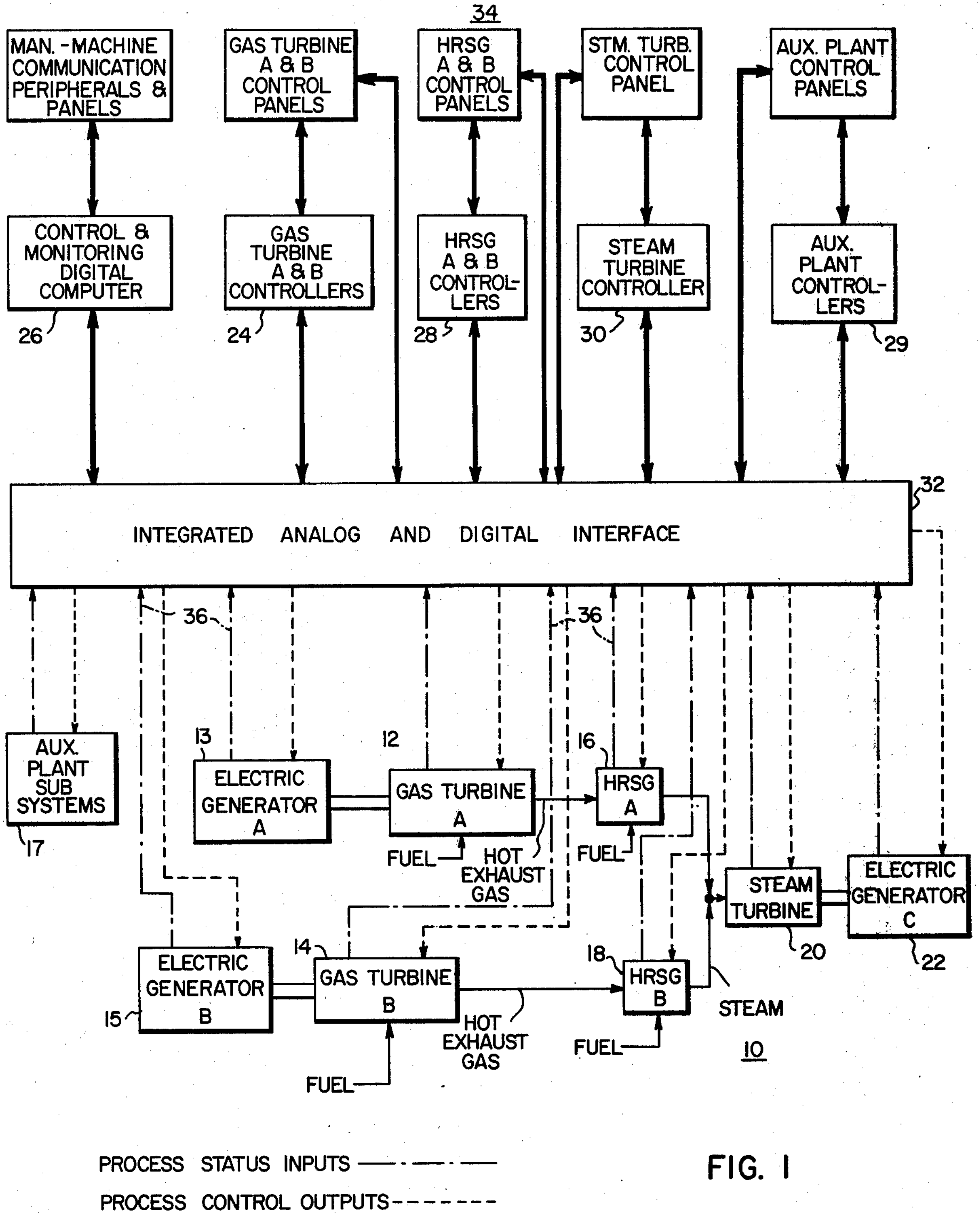
FIG. 1 shows a plant analog and digital control system employing an integrated analog/digital interface in accordance with the invention.

More particularly, there is shown in FIG. 1 a combined cycle electric power plant 10 in which the invention is embodied. The plant 10 includes two gas turbines 12 and 14 which drive respective electrical generators 13 and 15 and which supply hot gas to respective heat recovery steam generators (HRSG) 16 and 18 where steam is generated to drive a steam turbine 20 and another electric generator 22 and auxiliary plant function subsystems 17. Respective gas turbine controllers 24, HRSG controllers 28, auxiliary controllers 29 and a steam turbine controller 30 are provided for operating the plant equipment. A digital computer 26 operates in conjunction with the various controllers to provide certain startup control and data monitor functions. To provide improved system reliability, capital cost economy and reduced construction delay, an integrated digital/analog interface system 32 processes input/output signals to and from the computer 26 and the controllers 24, 28, 29 and 30 in relation to signals from an operator panel 34 and from turbine and plant sensors 36.

Figure 2:
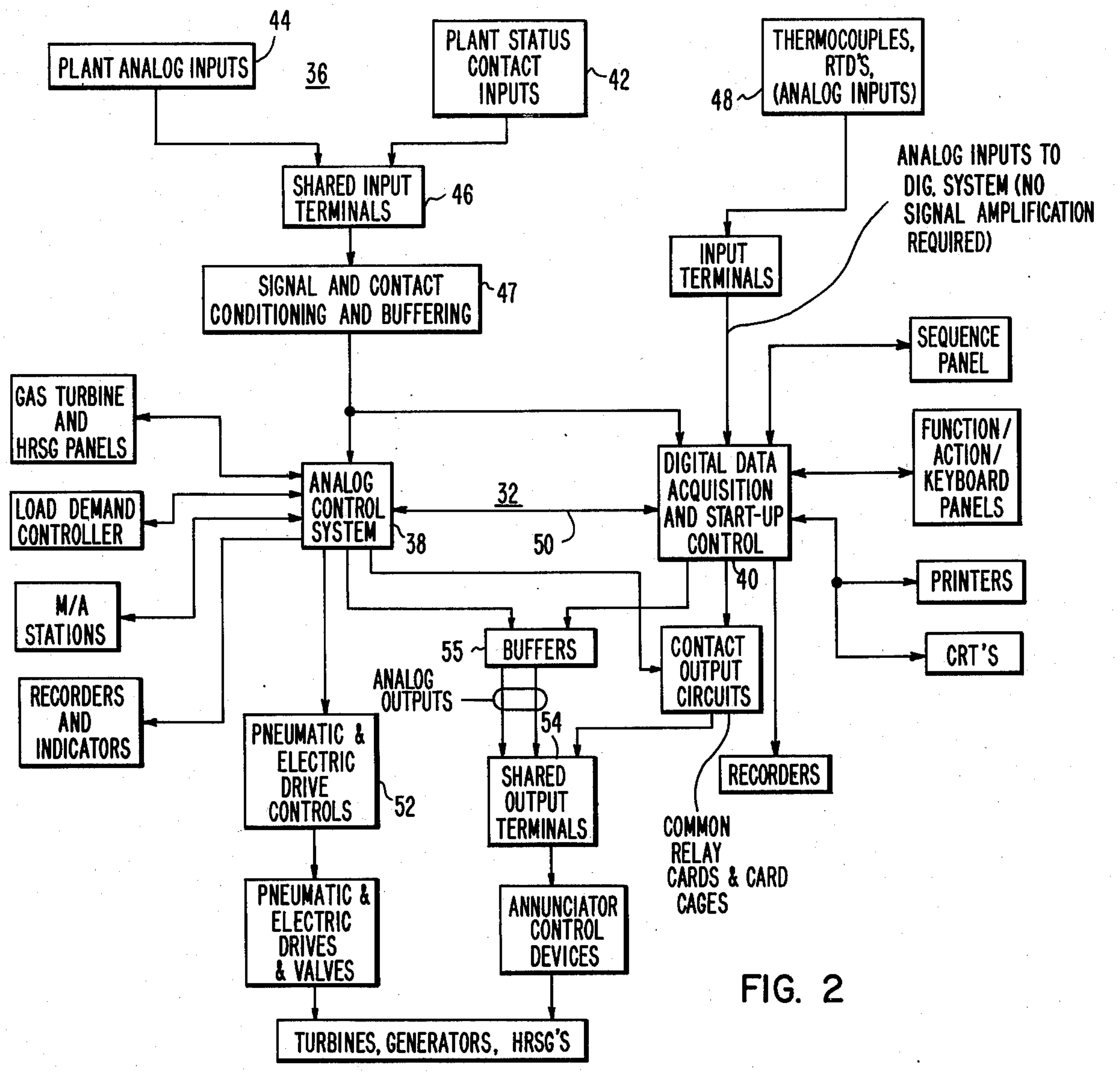
FIG. 2 shows the control system and the interface of FIG. 1 in more detail.

As shown in greater detail in FIG. 2, the integrated analog and digital interface system 32 connects to an analog control system 38 and a digital data acquisition and startup control system 40. In this case, the analog control 38 includes the controllers 24, 28, 29 and 30 and further includes circuitry which operates as a plant coordinated control and provides output control signals for the various controllers and control devices. The digital system 40 includes the computer 26 which may be a Westinghouse W2500 digital computer, and it provides data acquisition functions and generates control signals which provide automatic plant startup. In other applications of the invention, the division of functions between the analog and digital systems can be varied, and the level at which the joint digital/analog interface is made with the plant equipment controls can be brought closer to the equipment.

To provide significant savings in wiring, cabling and sensor costs, a single status contact set in block 42 or a single process transducer and associated transmitter in block 44 is provided for each process point to be monitored. The contact and sensor signals are applied to input terminals 46 and then conditioned and buffered in block 47 for system protection and signal compatibility. Each signal is then applied to the analog control 38 or the digital system 40 or to both the control 38 and the system 40. Various thermocouples, RTD and other plant analog signals in block 48 are applied only to the digital system 40 because these particular signals are not required in the analog system and further have no need for conditioning to high level signals.

Certain panel signals are applied to the analog control 38 or the digital system 40 or they are applied to panel indicator devices from the block 38 or 40 as shown in FIG. 2. Some output signals are directly and compatibly exchanged between the analog control 38 and the digital system 40 as indicated by the reference character 50.

Some analog output control signals are used only to drive pneumatic or electric actuators which operate valves, dampers, etc. associated with the turbine, generator, and HRSG units. Such signals are directly applied only to control 52 for the electric drives. Other analog output signals and digital output signals are channeled through a shared analog output and contact output terminal block 54 for application to the various plant controls or control devices. Buffering is provided for the analog output signals by block 55 to provide impedance and voltage level interfacing.

With the configuration shown in FIG. 2, digital-/analog hybrid control systems are efficiently produced for use with better reliability in electric power plants and other industrial applications. The system employs circuitry which provides compatibility between signals being applied to or taken from the digital and analog parts of the system. Significant savings in writing, cabling, buffer circuitry, cabinet space, and input/output circuit card requirements are achieved by common usage of compatible signals in the digital and the analog channels and by usage of common input/output cards and input/output cabinets for digital and analog signals. The need for duplicate process transmitters and plant alarm/status or sequence of event contact inputs for each of the systems is eliminated by using the sharing capability provided by use of the invention. Signal conditioning hardware and "terminations" for sending analog and digital signals back and forth between the analog control system and the digital computer system are not needed because of the signal level compatible hardware employed in the implementation of the invention. Further, separate analog output subsystems and contact output subsystems for each of the analog and digital systems are not needed with use of the common hybrid analog output subsystem and contact output subsystem in accordance with the invention.

In FIGS. 3–6, there are shown more detailed block diagrams of the input/output circuitry and the manner in which connections are made to provide the integrated digital/analog interface with the use of information centers which are often referred to as patch panels. FIGS. 7–10 show specific circuitry used to process (1) digital and analog input signals to form signals compatible for both analog and digital system use and (2) digital and analog output signals to form signals compatible for use with the control system or for use as output signals.

Figure 3:
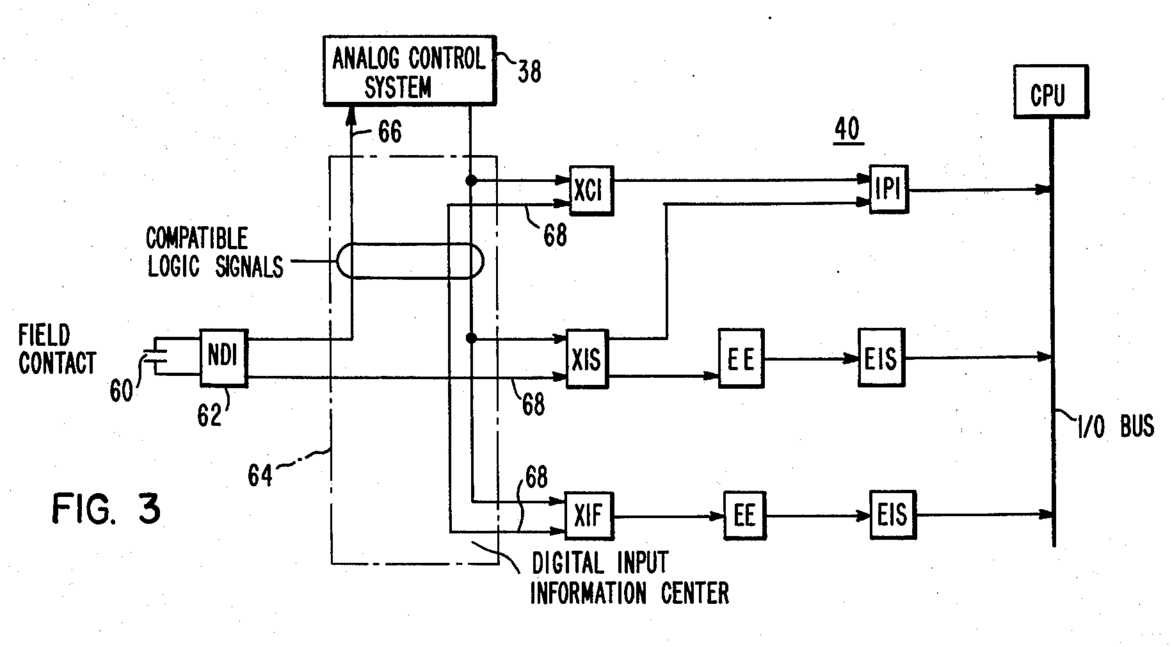
FIGS. 3–6 show more detailed block diagrams of the manner in which analog and digital inputs and outputs are interfaced for the analog and digital systems.
Figure 4:
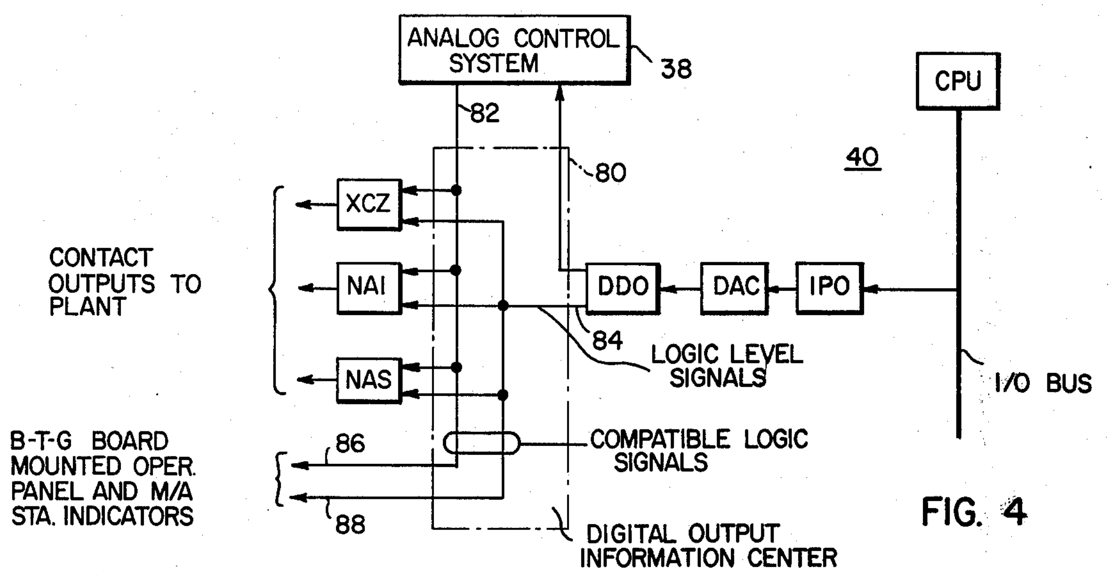
Figure 5:
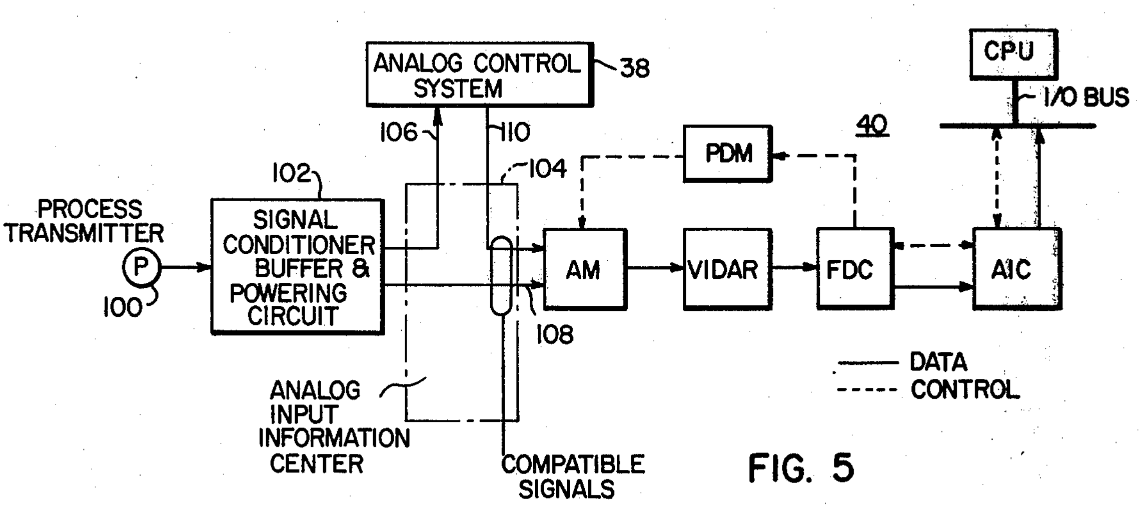
Figure 6:
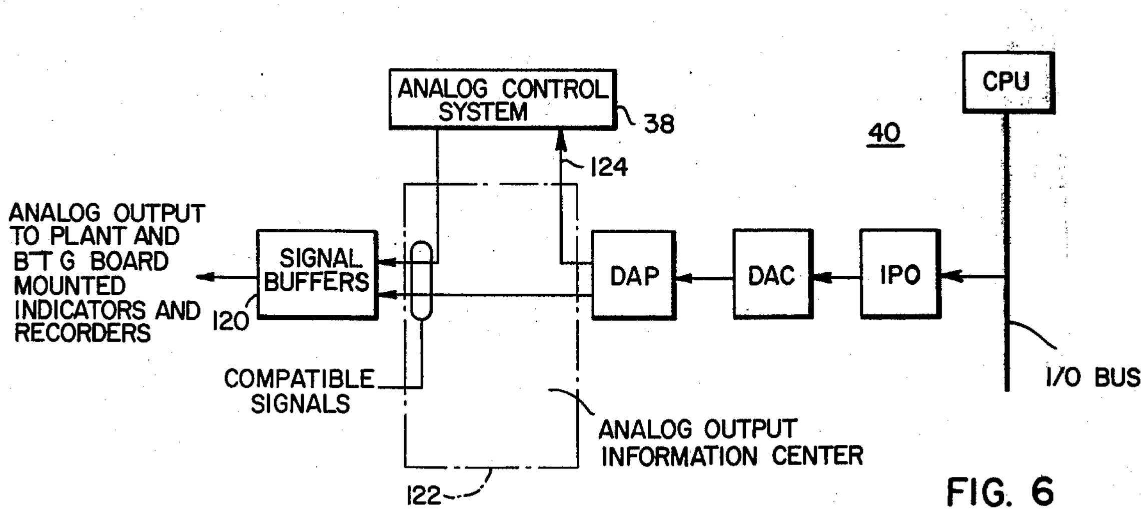

Various field contacts are coupled from the power plant through a common termination cabinet and conditioned to logic level signals by common NDI card circuits for use in both the analog and digital systems. As shown in FIG. 3, a typical single field contact 60 is connected through an NDI card 62 to an information center panel 64 where a logic level contact closure (digital) input signal is made commonly and compatibly available for the analog control system 38 or the digital system 40 as indicated by the reference characters 66 and 68 or for both systems. The digital inputs to the computer are processed through a contact closure digital input system including XCI, XIS and XIF cards which are used for different categories of digital signals. Digital signals which originate in the analog system 38 exist at the logic level and are therefore coupled through the digital input information center 64 for use in the digital system 40 without buffering or conditioning since the analog and digital system logic signal levels are compatible.

Figure 7:
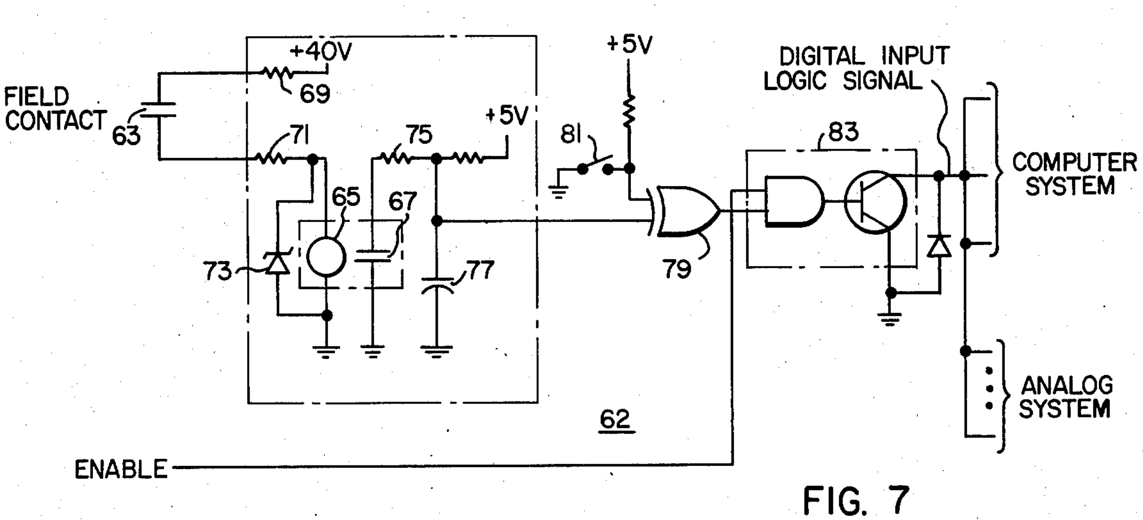
FIGS. 7–10 show interfacing circuits used in the blocks of FIGS. 3–6.

As shown in FIG. 7, the NDI card 62 conditions the field contact signal to the logic level for direct wire distribution to the digital and/or analog systems. Each contact signal may go to the digital system or the analog signal or to both systems in accordance with the plant design. The NDI card 62 includes 16 individual converter circuits. A field contact 63 is connected to converter input pins through shielded twisted pair. Current flows to energize a relay 65 and close contacts 67 when the field contact is closed. Resistors 69 and 71 isolate the converter from the other 15 converters on the card and zener diode 73 protects the relay coil from overvoltage faults applied to the converter inputs. Resistor 75 and capacitor 77 form a filter which rejects capacitive coupling between the coil and contacts of the relay and minimizes contact bounce. The filtered signal from relay is applied to one input of an exclusive--or gate 79 which is programmed by a switch 81 to either invert or repeat the signal. An output driver 83 provides an open collector logic output. When the switch 81 is open the output sinks current if the field contact is closed. When the switch 81 is closed, the output blocks current if the field contact is closed.

An enable circuit comprises a relay which detects a predetermined pin connection in the cable connector and outputs a logical 1 to enable all the output drivers 83 on the card. An output driver in the enable circuit sinks current when the converter outputs are disabled.

At the output side of the control system, contact outputs are applied to a digital output information center 80 (FIG. 4) from the analog control 38 and from the digital system 40 as indicated respectively by reference characters 82 and 84. Some digital outputs from the digital system 40 are routed to the analog system 38 through the information center 80 because compatible logic signal levels exist in the two systems and no buffering or conditioning is required. A digital output system comprising DDO, DAC and IPO cards is employed for outputting digital output signals to the information center 80.

Conventional relay output cards XCZ, NAI, and NAS, which each have multiple separate relay circuits, are used to a maximum in wiring the various analog and digital signals from the information center to the plant. Such efficiency is achieved by the integrated analog/-digital interface including the information center 80 because relay circuits which would otherwise go unused on a card, if only digital system or only analog system signals were being handled, are put in use with handling of the analog and digital system signals on the same cards and on different cards in the same card cages. Other analog and digital system digital output signals are applied directly to indicators, etc. as indicated by the reference characters 86 and 88 since these signals do not require relay coupling.

Figure 8:
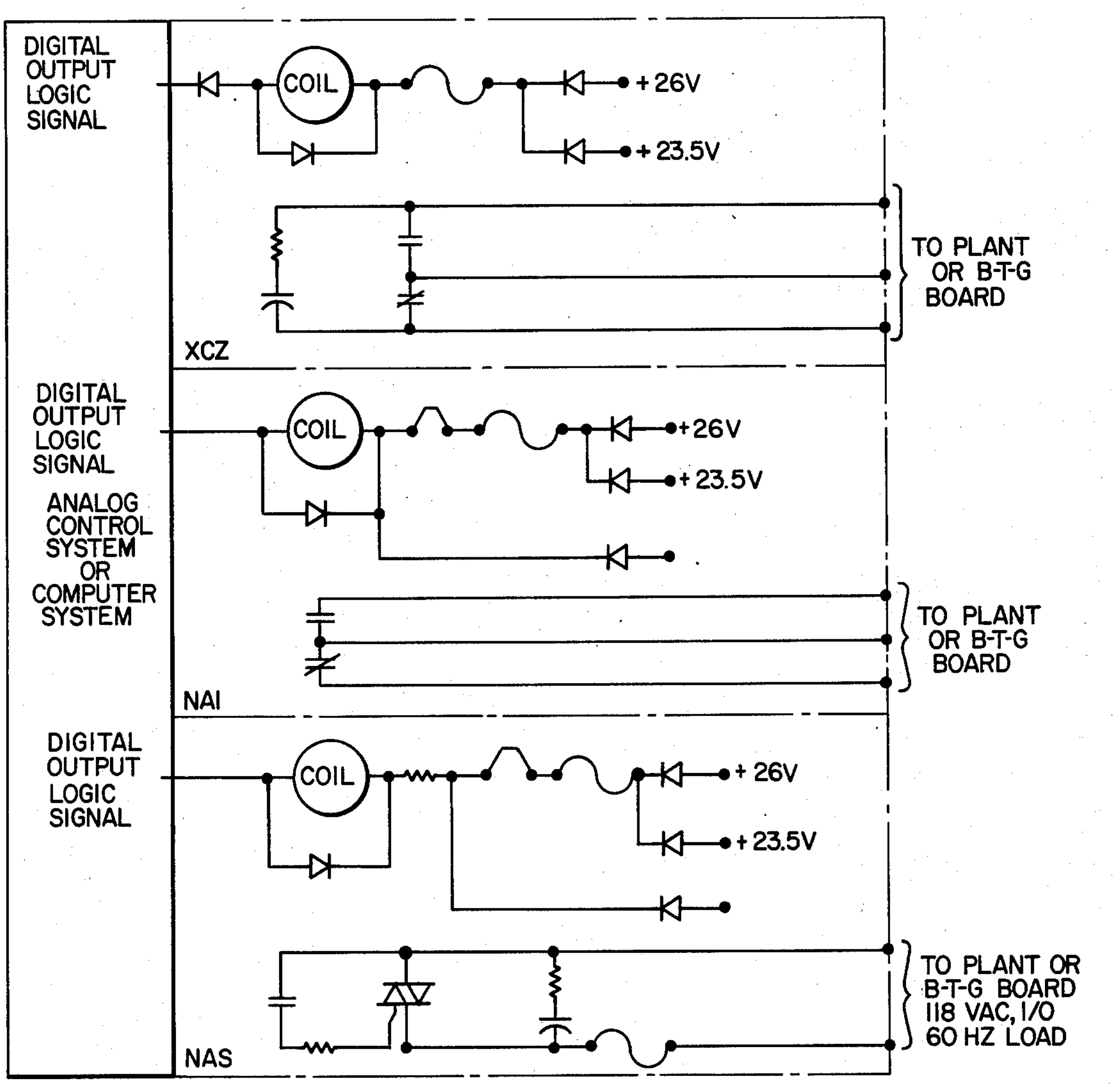

FIG. 8 shows respective relay circuits used in multiples on the XCZ, NAI and NAS cards. The three relay card circuits function identically in providing contact closure outputs in response to the respective digital output logic signal being ON. The three relay card circuits differ only in the contact output voltage and current handling capacities needed for coupling to the types of loads in the power plant or the industrial process. One side of the relay coil in each of three types of circuits is connected to 26 volt and 23.5 volt DC power supplies through auctioneering diodes. The other side of the relay coil is connected to the respective digital output logic signal through the digital output information center 80. The digital output logic signal may have originated either in the analog control system 38 or in the digital system 40. When the digital output logic signal is OFF, the respective relay coil stays deenergized and its contact output is in the open position. When the digital output signal is turned ON, the respective relay coil becomes energized and its contact output is closed.

The NAS Card includes additional Triac circuitry for switching external 118 volt AC source to its load. The relay contact closure output, described above is not coupled to the power plant or industrial process directly, but instead is applied to the Triac circuit. The Triac is a bidirectional device that conducts on each positive and negative half cycle of the AC voltage; it does not conduct from −7 to +7 volts. The minimum holding current during this time is 30 mA rms at 0° Centigrade. When the input relay deactivates, the Triac shuts itself off within one-half cycle of the AC voltage.

With respect to analog input signals, a process transmitter 100 generates an analog signal from a single process transducer for multiple system uses. The signal is passed through a signal conditioner, buffer and powering circuit 102 to an analog input information center 104. The signal thus is provided in a form and under conditions which are compatible with both the analog system 38 and the digital system 40. Each analog input signal is applied to the analog system 38 as indicated by the reference character 106 or to the digital system as indicated by the reference character 108 or to both the analog and digital systems. Analog input signals to the digital system 40 originating from the analog system 38 are compatible with the digital system and are coupled thereto through the information center 104 as indicated by the reference character 110 without buffering or conditioning. The analog input system for the digital system 40 conventionally includes a multiplexer card AM, a voltage to frequency converter subsystem VIDAR, and a frequency to digital converter card FDC.

Figure 9:
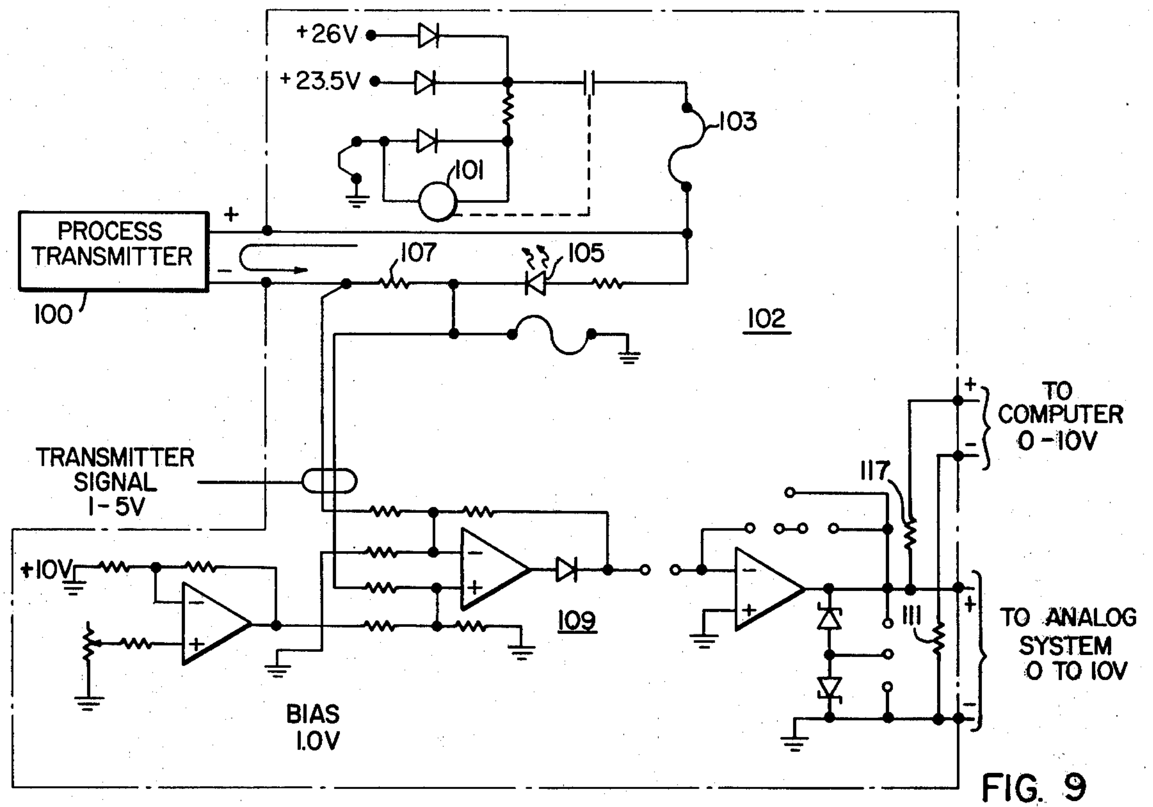

As shown in FIG. 9, the analog input conditioner circuit 102 powers the transmitter, buffers the transmitter for control system protection and provides an output signal at a voltage level and with impedance characteristics which are compatible with the downstream analog and digital system uses. The field-mounted process transmitter 100 is powered from 26 volt and 23.5 volt DC power supplies through auctioneering diodes. A relay 101 operates to provide power to the transmitter if at least one power supply is available. The powering circuit has a fuse 103 and a light emitting diode 105 to indicate "power on". The transmitter output 4 to 20 mA DC current signal corresponding to the process measurement and returns this signal on the same two wires used to power the transmitter. The 4 to 20 mA current signal is converted to 1 to 5 V DC signal across a 252.5 ohm dropping resistor 107. This 1 to 5 V DC transmitter signal and a 1 V bias signal is applied to a dual stage operational amplifier circuit 109 to buffer the transmitter signal and convert the voltage range to 0 to 10 V DC for use in the analog control system 38. The 0 to 10 V DC transmitter signal is also connected to the computer analog input subsystem through two 15K ohm resistors 109 and 111. These resistors serve as a buffer between the analog control system 38 and the digital system 40 and provide shortcircuit protection for the analog control system by providing a 30K ohm load across the 0 to 10 V DC transmitter signal from the output of the operational amplifier if a short-circuit occurs at the digital system input terminals.

Compatible analog output signals are applied to signal buffers 120 (FIG. 6) from the analog control system 38 and the digital system 40 through an analog output information center 122. The digital system signals are coupled to the information center 122 through a conventional analog output system comprising DAP, DAC and IPO circuit cards. Digital system analog output signals used in the analog control system 38 are compatible with it and they are coupled thereto through the information center 122 without conditioning or buffering as indicated by the reference character 124.

Figure 10:
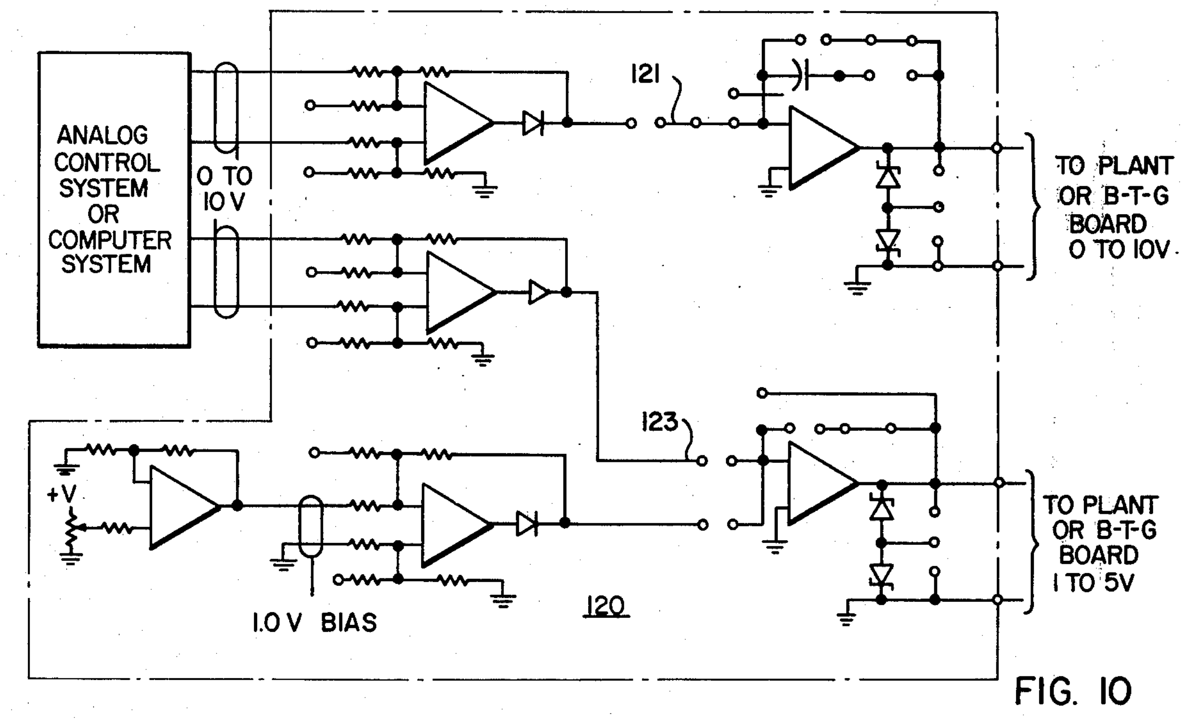

As shown in FIG. 10, each buffer circuit 120 processes analog signals (0 to 10 V scale) from the analog control 38 or the digital system 40 and generates a buffered output signal having a scale of 0 to 10 V or a buffered output signal having a scale of 1 to 5 V. The buffering and signal sealing functions are accomplished using a dual stage cascaded operational amplifier circuit 121 or 123. When the output device requires the 0 to 10 V range signal, the dual stage operational amplifier circuit 121 is hardware programmed at unity gain to serve as a buffer between the analog control system 38 or the digital system 40 and the output device. When the output device requires the 1 to 5 V range, the dual stage cascaded operational amplifier circuit 123 is hardware programmed at 0.4 gain to scale the 0 to 10 V range analog output signal to a 0 to 4 V range signal and it is then summed with a 1 V bias signal to generate the 1 to 5 V scaled signal. In addition to the scaling function, the dual stage cascaded operational amplifier circuit 121 or 123 also serves as a buffer between the analog control system 38 or the digital system 40 and the output device.

Figure 11A:
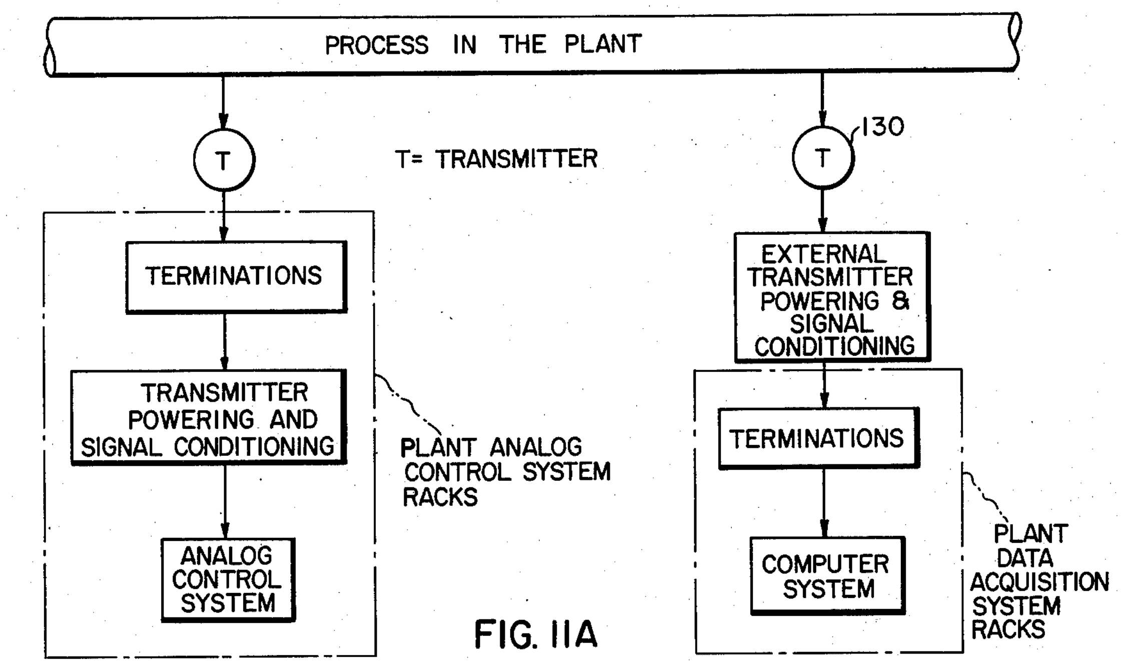
FIG. 11A PRIOR ART
FIGS. 11A–14B show various prior art interfacing schemes and the improvements realized with comparable arrangements in accordance with the invention.
Figure 11B:
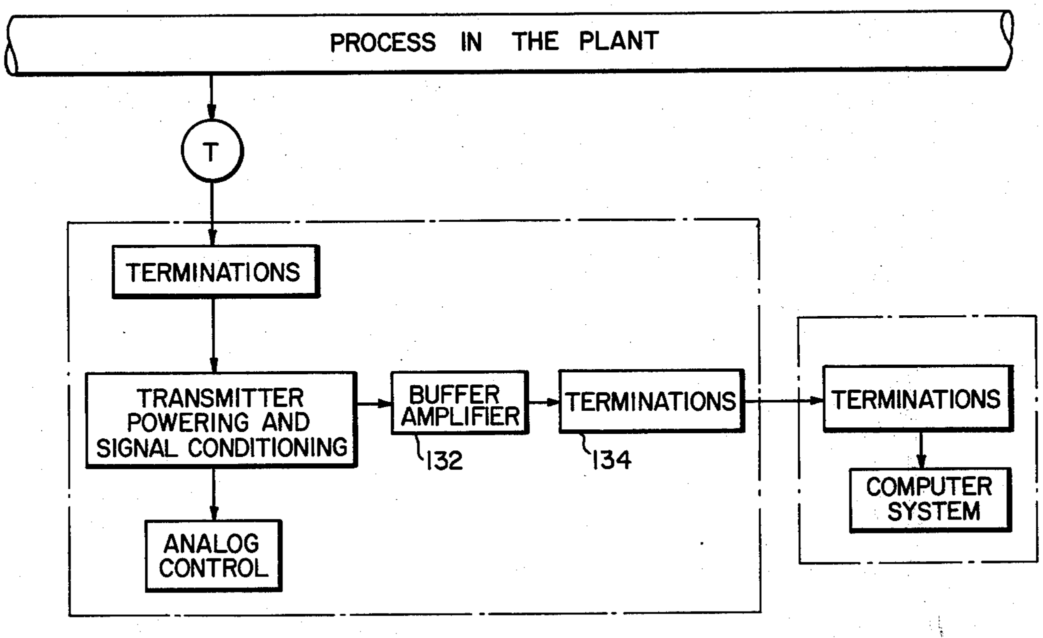
FIG. 11B PRIOR ART
Figure 11C:
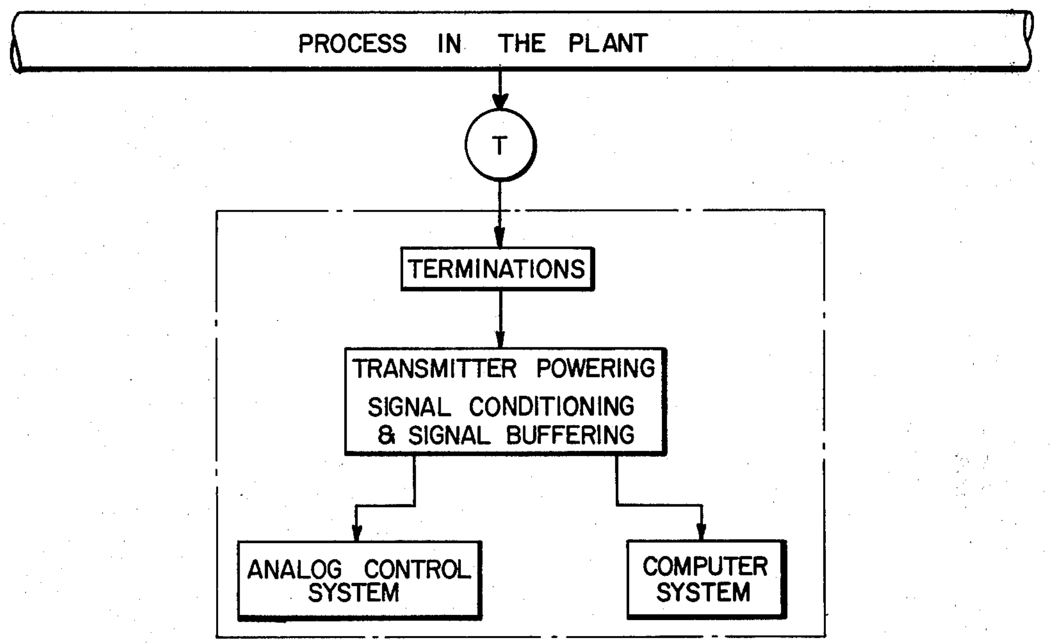

FIGS. 11A through 11B illustrate schematically the improvements made possible over the known prior art through use of interfacing circuitry in accordance with the present invention. Thus, as shown in prior art FIG. 11A an extra transmitter 130 and associated powering and signal conditioning circuitry terminations is required for analog inputs. In the alternative prior art scheme of FIG. 11B, extra buffering and termination circuitry 132 and 134 is required. FIG. 11C shows the more efficient analog input scheme for an integrated digital/analog system in accordance with the present invention.

Figure 12A:
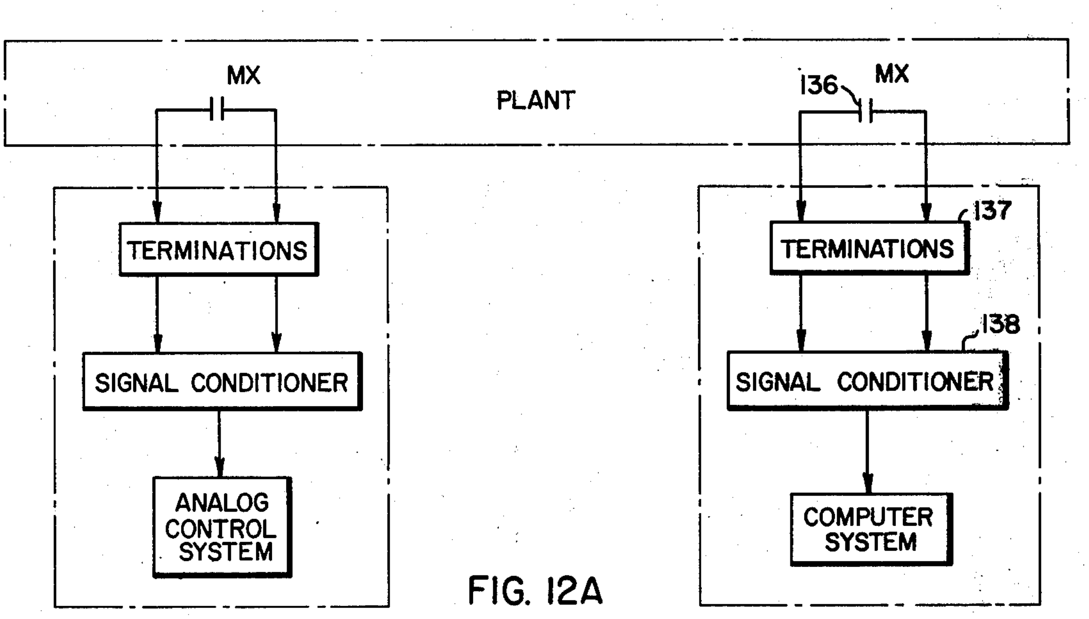
FIG. 12A PRIOR ART
Figure 12B:
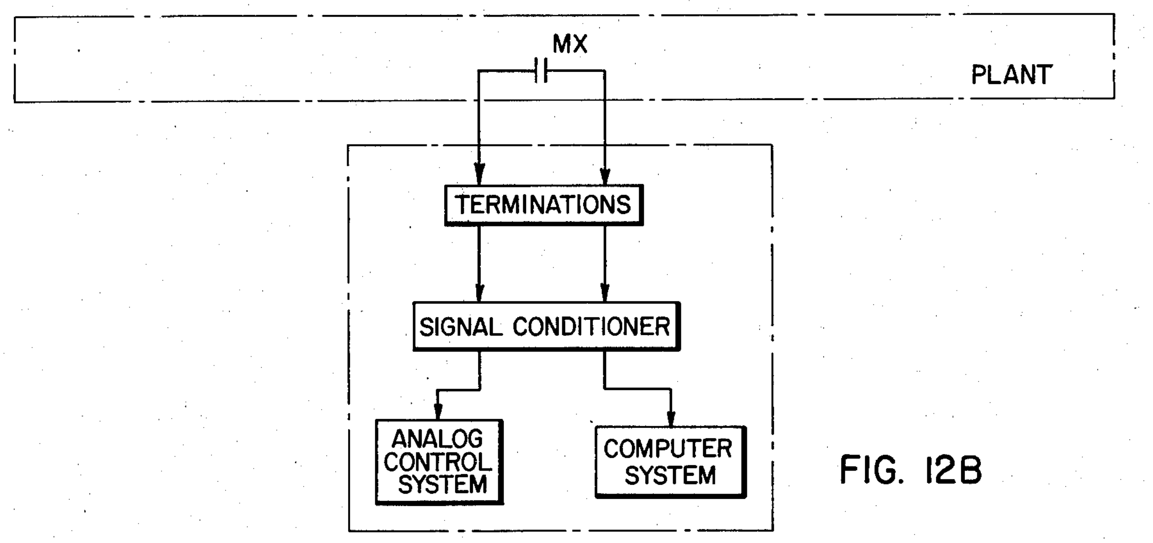
Figure 13A:
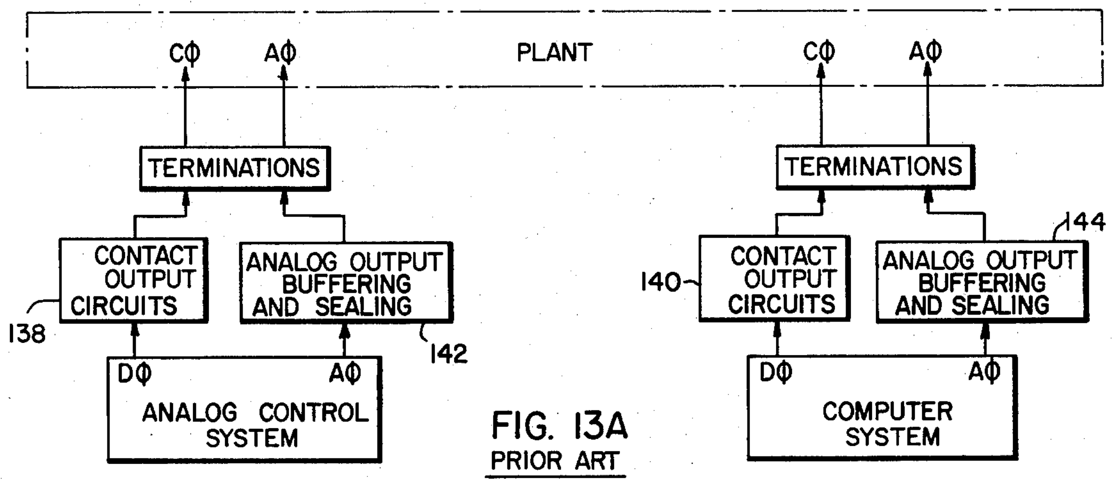
FIG. 13A PRIOR ART
Figure 13B:
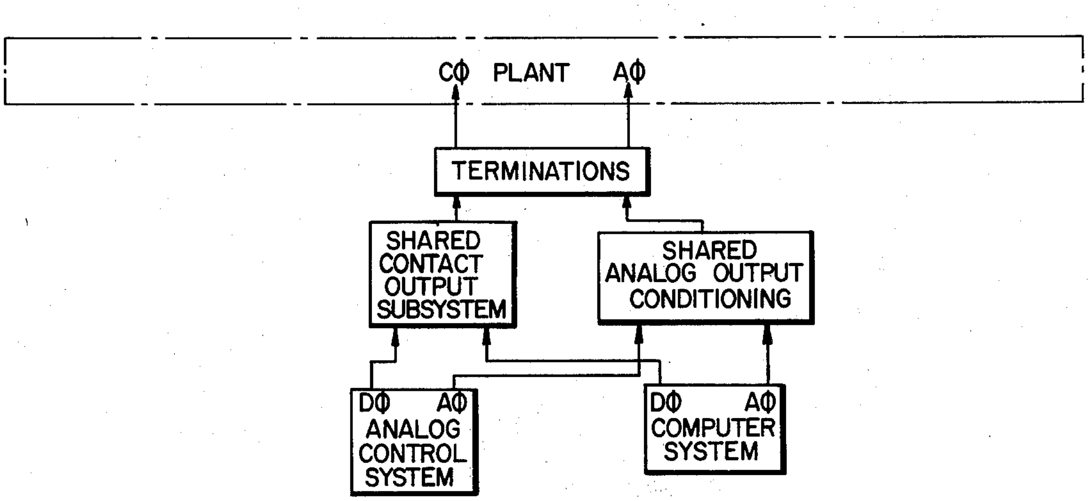

Similarly, FIG. 12A shows a prior art contact input scheme which requires an extra plant contact 136 terminations 137 and associated circuitry 138 whereas FIG. 12B shows the more efficient contact input scheme of the present invention. FIG. 13A shows a prior art contact and analog output scheme in which separate contact output card cages 138 and 140 are required and within which relay circuit cards are not used to the fullest extent possible because of the separate cabinetry; and separate analog buffering and scaling circuit card cages 142 and 144 are required as contrasted to the output interface provided by the present invention as shown in FIG. 13B.

Figure 14A:
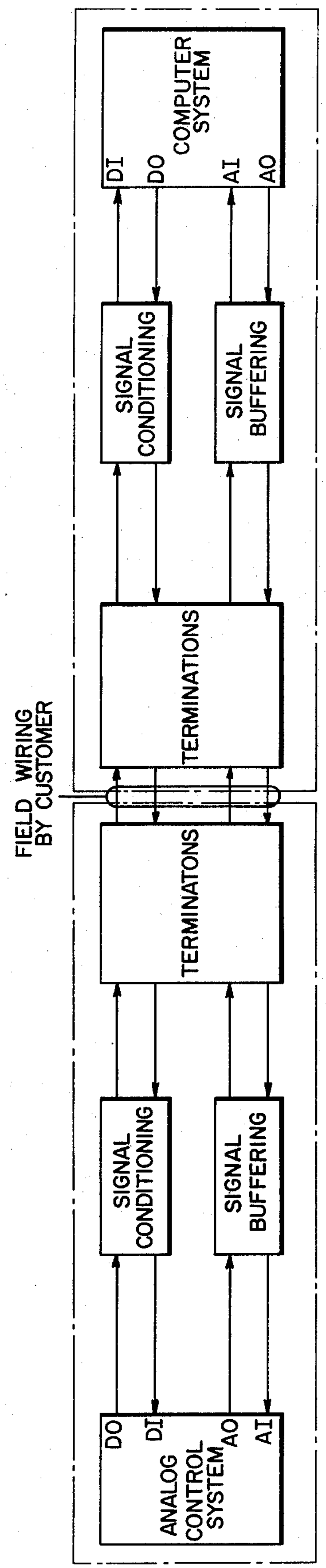
FIG. 14A PRIOR ART
Figure 14B:
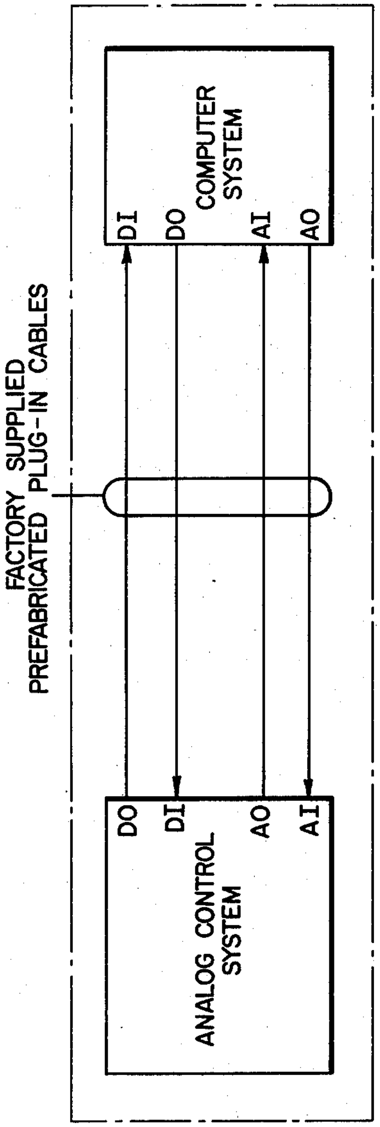

FIG. 14A shows the prior art arrangement for exchanging digital and analog signals between the analog and digital systems in which significant buffering and conditioning circuit requirements exist. FIG. 14B shows the more efficient interface provided by the present invention.

Figure 15A:
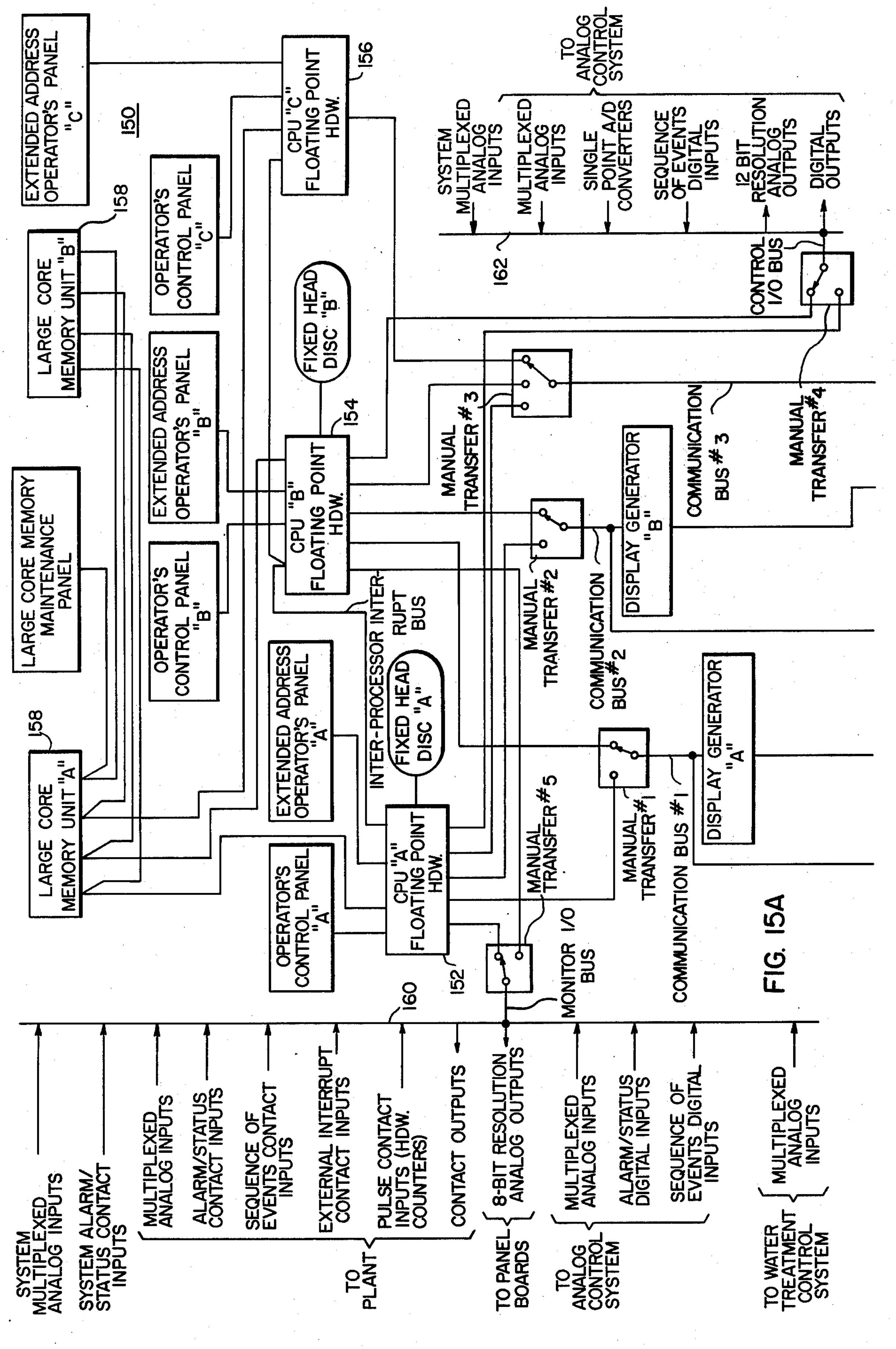
FIG. 15 shows another embodiment of the invention in which multiple digital processors are employed.
Figure 15B:
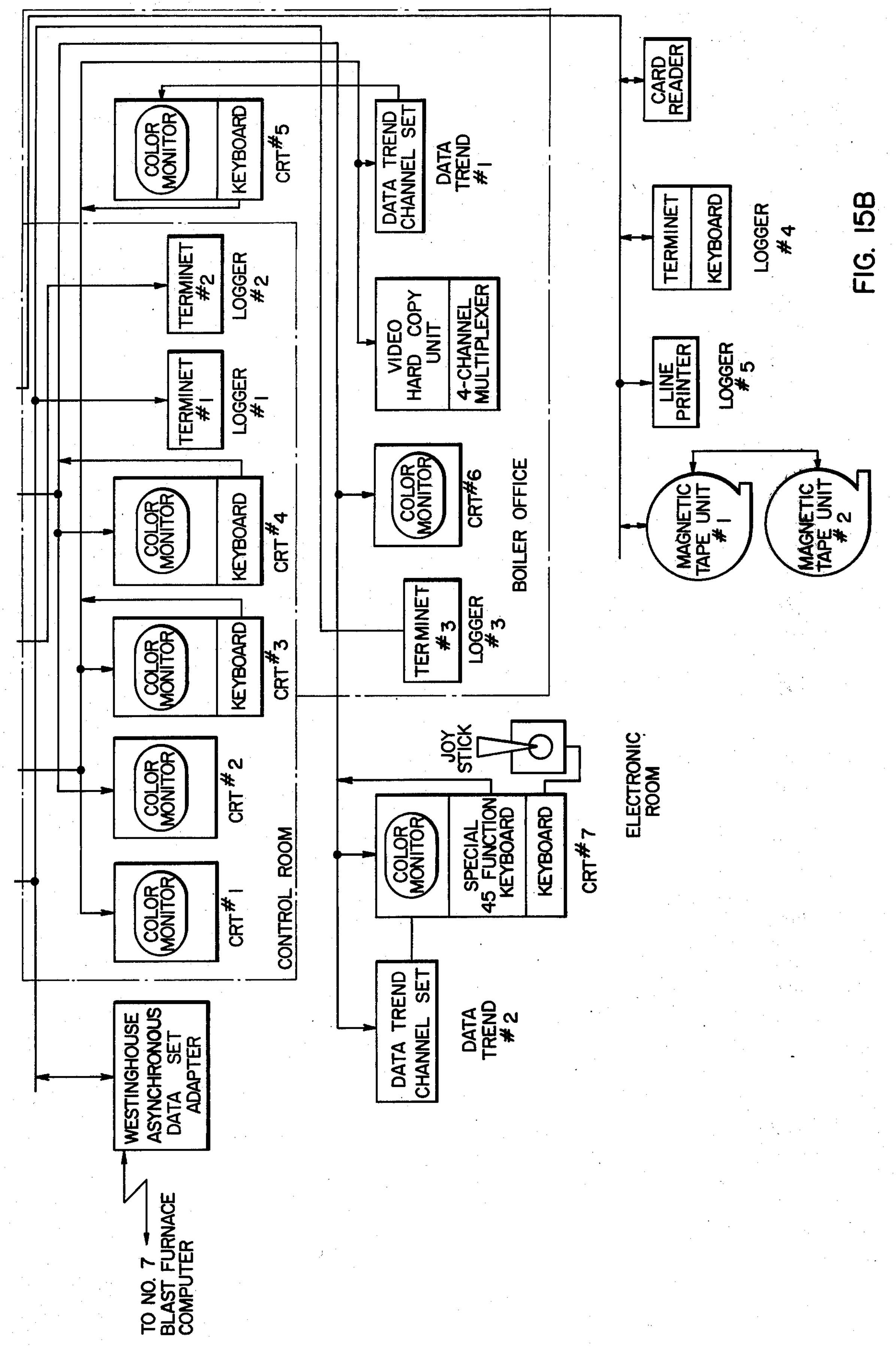

In FIG. 15, there is shown another embodiment of the invention in which a system 150 in which three separate computers 152, 154 and 156 employ a shared core memory 158 in controlling three steel mill boilers and two steam turbine driven blowers. In this instance, contact and analog inputs or outputs to or from the plant or the analog control system are transmitted through a common I/O bus 160 or 162. Interfacing circuitry (not shown) like that previously described is used to make compatible digital signals and compatible analog signals available for both the analog control and the multiprocessor digital system in accordance with the invention.

What is claimed is:

1. An integrated digital/analog control system for an electric power or other industrial plant comprising an analog control system and a digital control system, said control systems having means for generating outputs which control the plant in response to input signals therefrom, a plurality of plant transducers and transmitters generating respective input analog signals for use in controlling the plant, respective circuit means for powering each of said analog transmitters and for generating buffered analog signals corresponding to the transmitted analog signals and being compatible with both said analog and digital control systems, an analog input information panel for terminating the buffered analog signals, means for coupling each of said buffered analog input signals from said analog input information panel to one or both of said analog and digital control systems, a plurality of plant contacts generating respective input digital signals for use in controlling the plant, respective circuit means for conditioning each of said digital signals to a logic level compatible to said analog and digital control systems, a digital input information panel for terminating the digital input logic signals, and means for coupling each of said digital input logic signals from said digital input information panel to one or both of said analog and digital control systems.

2. A system as set forth in claim 1 wherein means are provided for coupling preselected digital and analog output signals from said digital control system to said analog control system without buffering and conditioning, and means are provided for coupling preselected digital and analog output signals between said analog control system and said digital control system without buffering and conditioning.

3. A system as set forth in claim 2 wherein each of said coupling means includes wiring connections made through said information panels.

4. A system as set forth in claim 1 wherein a digital output information panel is provided, means are provided for coupling digital signals at compatible logic levels from said analog and digital control systems to said digital output information panel, means are provided for coupling said digital output signals from said digital output information panel to the plant or to an operator panel, an analog output information panel is provided, means are provided for coupling analog signals at compatible voltage levels from said analog and digital control systems to said analog output information panel, and circuit means are provided for buffering each of said analog output signals and for coupling the same to the plant or the operator panel.

5. A system as set forth in claim 4 wherein a plurality of relay circuit cards having plural separate relay circuits are included in said contact output information panel and at least some of said cards have contact outputs from both said digital and said analog control systems coupled thereto.

6. A system as set forth in claim 4 wherein said digital control system includes a plurality of digital processors and bus means are provided for distributing input/output signals among said processors.

7. A system as set forth in claim 1 wherein said analog input circuit means generates a corresponding signal with one voltage scale for said analog control system and another corresponding buffered signal for said digital control system to protect said analog control system from short circuits in the digital control system.

* * * * *